United States Patent [19]
Savage et al.

[11] Patent Number: 5,951,853
[45] Date of Patent: Sep. 14, 1999

[54] REFINERY ATMOSPHERIC PIPESTILL WITH AMMONIA STRIPPING

[75] Inventors: David W. Savage, Lebanon; Guido Sartori, Annandale, both of N.J.

[73] Assignee: Exxon Research and Engineering Co., Florham Park, N.J.

[21] Appl. No.: 09/167,152

[22] Filed: Oct. 6, 1998

[51] Int. Cl.⁶ .................................................. B01D 3/00
[52] U.S. Cl. .......................... 208/347; 208/347; 208/348; 208/356
[58] Field of Search ................. 208/47, 347, 348

[56] References Cited

U.S. PATENT DOCUMENTS

| 4,457,837 | 7/1984 | Farnham | 208/47 |
| 4,486,299 | 12/1984 | Kettinger | 208/47 |
| 4,806,229 | 2/1989 | Ferguson et al. | 208/47 |
| 5,326,482 | 7/1994 | Leard et al. | 208/348 |
| 5,714,664 | 2/1998 | Fearnside et al. | 585/950 |

FOREIGN PATENT DOCUMENTS

| 59-102985 | 6/1984 | Japan. |
| 1147734 | 3/1985 | U.S.S.R. . |

*Primary Examiner*—Helane Myers
*Attorney, Agent, or Firm*—Estelle C. Bakun

[57] ABSTRACT

In an atmospheric pipestill stripping process where steam is utilized as the stripping gas to strip bottoms and side stream products, the improvement comprising utilizing ammonia or a ammonia and steam mixture as said stripping gas wherein when an ammonia and steam mixture is utilized the ratio of ammonia to steam is about 0.1:1 to about 100:1. In a refinery atmospheric pipestill stripping process utilizing a stripping gas, said process comprising utilizing a gas selected from the group consisting of ammonia and a mixture of ammonia and steam as said stripping gas wherein when an ammonia and steam mixture is utilized the ratio of ammonia to steam is about 0.1:1 to about 100:1.

5 Claims, 1 Drawing Sheet

FIGURE
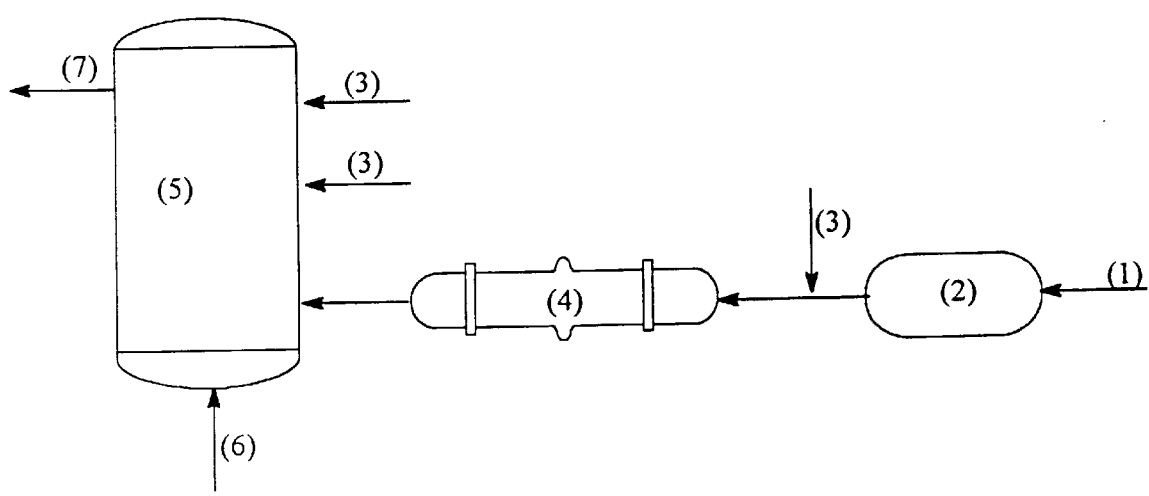

REFINERY ATMOSPHERIC PIPESTILL WITH AMMONIA STRIPPING

FIELD OF THE INVENTION

This invention relates to reducing the corrosivity of corrosive crudes in a refinery pipestill while using decreased amounts of steam for atmospheric pipestill stripping.

BACKGROUND OF THE INVENTION

Crude oil refineries include an atmospheric pressure pipestill (APS) which fractionates the whole crude oil into various product fractions of different volatility, including gasoline, fuel oil, gas oil, and others. The lower boiling fractions, including naphtha, from which gasoline is derived, are recovered from the overhead fraction. The fractions with intermediate volatility are withdrawn from the tower as side streams. Side stream products include kerosene, jet fuel, diesel fuel, and gas oil. The higher up on the column the side stream is withdrawn, the more volatile the product. The heaviest components are withdrawn in the tower bottoms stream.

Stripping with steam is employed in atmospheric pipestills to strip bottoms and all side stream products (kerosene, diesel, gas oil). Without stripping, the typical pipestill, at best would be a poor fractionator. Steam stripping is used to adjust the front end of each liquid product to optimize the load to downstream processing, meet product specifications, or avoid downgrading a more valuable lighter product. Steam has historically been utilized as a stripping gas because it is available, inert and condensable and, thus, easily separated from hydrocarbons.

Several references teach the use of very small quantities of ammonia in a refinery including in pipestills. (See, for example, J59-102985; SU 1,147,734; U.S. Pat. No. 4,457,837; U.S. Pat. No. 4,486,299; and U.S. Pat. No. 5,326,482.)

The amounts of ammonia utilized in the above references are several fold less than the amounts required in the instant process.

BRIEF DESCRIPTION OF THE FIGURE

The FIGURE shows a typical introduction of petroleum oil into a refinery. (1) is the petroleum oil, (2) the desalting unit, (3) and (6) ammonia addition points, (4) a heat exchanger, (5) an atmospheric pipestill, and (7) ammonia recovery.

SUMMARY OF THE INVENTION

In an atmospheric pipestill stripping process where steam is utilized as the stripping gas to strip bottoms and side stream products, the improvement comprising utilizing ammonia or an ammonia and steam mixture as said stripping gas wherein when an ammonia and steam mixture is utilized the ratio of ammonia to steam is about 0.1:1 to about 100:1.

In a refinery atmospheric pipestill stripping process utilizing a stripping gas comprising utilizing a gas selected from the group consisting of ammonia and mixtures of ammonia and steam as said stripping gas wherein when an ammonia and steam mixture is utilized the ratio of ammonia to steam is about 0.1:1 to about 100:1.

DETAILED DESCRIPTION OF THE INVENTION

In the past, atmospheric pipestill stripping with steam has been utilized to strip bottoms and side stream products (e.g., kerosene, diesel, gas oil, etc.). Applicants have discovered that utilizing pure ammonia in place of the steam as the stripping gas, or alternatively utilizing an ammonia and steam mixture as the stripping gas, affords a much improved stripping process.

Applicants believe that stripping with ammonia offers several advantages. The ammonia can react with corrosive acids present in the crude oils being introduced into the pipestill, particularly naphthenic acids, forming non-corrosive amides of the naphthenic acids. This is most beneficial since corrosion in pipestills is a major concern for the refinery. Likewise, reduction of acidity will allow for processing of low-cost acidic crudes in existing equipment.

Additionally, use of ammonia would back out an equivalent amount of steam thereby reducing the amount of sour water produced from the pipestill. Sour water is a refinery concern since it accounts for a significant portion of the load (approximately 55%) on the waste water treatment plant. In light of stricter environmental regulations, any lessening of waste loads is beneficial.

In the refinery, crude oil is passed to a desalter and heat exchanger prior to entering the atmospheric pipestill. In the instant invention, the ammonia would be introduced into the crude just after the desalter. This allows for ammonia reaction with naphthenic acids in the crude during heat exchange.

In the instant invention, ammonia may be utilized as the sole stripping gas. Alternatively, a mixture of ammonia and steam may be used as the stripping gas. In the case of a mixture, the ratio of ammonia to steam will be about 0.1:1 to about 100:1, preferably about 1:1 to about 10:1. The ammonia may be mixed with the petroleum oil following the desalting unit, if present, just prior to entering the heat exchanger and will be heated in the heat exchanger just prior to entering the atmospheric pipestill (APS). The heat of the heat exchanger will be sufficient to introduce the ammonia as a gas or vapor into the atmospheric pipestill unit and to achieve amidation with the organic acids contained in the crude. Thus, the ammonia and crude will be heated to a temperature of at least about 250° C., more preferably at least about 350° C. in the heat exchangers. Alternatively, the ammonia may be introduced along with steam or alone into the bottom of the atmospheric pipestill or at any port along the length of the pipestill. At least two ports along the pipestill are shown in the FIGURE. However, more or less ports may be used. Preferably, the ammonia will be introduced to the bottom of the pipestill or following the desalting unit.

Any excess ammonia utilized in the stripping process may be recovered if desired. Recovery is easily accomplished by the skilled artisan.

In the instant invention, the refinery atmospheric pipestill is operated in the typical manner known to the skilled artisan. The only modification necessary to carry out the instant invention is that ammonia or an ammonia and steam mixture be utilized as the stripping gas in the atmospheric pipestill.

What is claimed is:

1. In an atmospheric pipestill stripping process where steam is utilized as the stripping gas to strip bottoms and side stream products, the improvement comprising utilizing ammonia or an ammonia and steam mixture as said stripping gas wherein when an ammonia and steam mixture is utilized the ratio of ammonia to steam is about 0.1:1 to about 100:1.

2. In a refinery atmospheric pipestill stripping process utilizing a stripping gas, said process comprising utilizing a gas selected from the group consisting of ammonia and a mixture of ammonia and steam as said stripping gas wherein when an ammonia and steam mixture is utilized the ratio of ammonia to steam is about 0.1:1 to about 100:1.

3. The process of claim 1 or 2 wherein when said stripping gas is a mixture of ammonia and steam, the ratio of ammonia to steam is about 0.1:1 to about 100:1.

4. The process of claim 1 or 2 wherein the stripping gas is heated to a temperature of at least about 250° C.

5. A method for reducing the amount of sour water produced from an atmospheric pipestill stripping process utilizing steam as a stripping gas comprising utilizing a gas selected from the group consisting of ammonia and a mixture of ammonia and steam in place of said steam stripping gas wherein when an ammonia and steam mixture is utilized the ratio of ammonia to steam is about 0.1:1 to about 100:1.

* * * * *